(12) United States Patent
Jinno et al.

(10) Patent No.: US 6,356,187 B2
(45) Date of Patent: Mar. 12, 2002

(54) PASSENGER DETECTION SYSTEM

(75) Inventors: Kazunori Jinno, Osaka; Masanori Sugino, Kanagawa, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/102,918

(22) Filed: Jun. 23, 1998

(30) Foreign Application Priority Data

Jun. 23, 1997 (JP) .............................................. 9-166207

(51) Int. Cl.$^7$ ................................................. B60Q 1/00
(52) U.S. Cl. ........................ 340/438; 340/561; 340/567; 701/45; 701/46; 701/47; 280/732; 280/734; 280/735; 180/271
(58) Field of Search ................................ 340/438, 561, 340/567; 701/45–47; 280/735, 732, 734; 180/268, 271, 272

(56) References Cited

U.S. PATENT DOCUMENTS

| 4,796,013 A | * | 1/1989 | Yasuda ........................ 340/562 |
| 4,885,566 A | * | 12/1989 | Aoki et al. ............... 340/457.1 |
| 5,871,232 A | * | 2/1999 | White ........................ 280/735 |
| 5,914,610 A | * | 6/1999 | Gershenfeld et al. ....... 324/663 |
| 5,936,412 A | * | 8/1999 | Gershenfeld et al. ....... 324/663 |
| 5,948,031 A | * | 9/1999 | Jinno et al. .................... 701/45 |

FOREIGN PATENT DOCUMENTS

| JP | 9-42650 | 9/1998 |
| JP | 10-236270 | 9/1998 |
| WO | WO-97/30864 | * 8/1997 |

* cited by examiner

*Primary Examiner*—Julie Lieu
(74) *Attorney, Agent, or Firm*—Sughrue Mion, PLLC

(57) ABSTRACT

A passenger detection system for detecting seating status of a passenger on a seat of a vehicle in which structure of electrodes placed on the seat is improved, is proposed. A plurality of electrodes are placed apart on the upper side of the seat, and a weak alternating electric field is generated between a transmission electrode, selected from the electrodes plurality of and reception electrodes other than the transmission electrode, and displacement currents passing in the reception plurality of electrodes, caused by the weak alternating electric field are detected. The seating status of the passenger on the seat is determined by analyzing the detected displacement currents. An electrode structure is preliminarily formed by fixing the electrodes apart on an electrical insulating base material, and the electrode structure is placed between a cushion material and a covering material of the seat. Preferably, the electrode structure is fixed to one or more components of the seat. For example, the electrodes are formed of electrically conductive fabric and the electrodes are fixed to the base material by means of bonding by heating of thermoplastic resin or thermosetting resin. According to the system, installation of the electrodes on the seat can be performed efficiently and the seating status can be detected precisely with constant distances between the electrodes.

15 Claims, 7 Drawing Sheets

PASSENGER DETECTION SYSTEM

BACKGROUND OF THE INVENTION

The present invention relates to a passenger detection system, and in particular, to a passenger detection system for detecting seating status of a passenger on a seat of a vehicle provided with an air bag system in which the structure of the electrodes placed on the seat is improved. The passenger is detected by placing a plurality of electrodes apart on the seat and generating a weak alternating electric field between a transmission electrode, plurality of selected from the electrodes, and reception electrodes other than the transmission electrode, and detecting displacement currents passing in the reception electrodes caused by the weak alternating electric field.

DESCRIPTION OF THE PRIOR ART

Air bag units for absorbing shocks and providing relief from impact damage to car passengers in cases of collisions have become indispensable gear for car safety, and are being provided not only for driver's seats but also for passenger seats in recent years.

FIG. 1 is a circuit diagram showing a conventional circuit employed in air bag systems. The circuit of FIG.1 comprises: a driver's seat squib circuit composed of a series connection of a safety sensor SS1 such as a mechanical accelerometer, a squib SQ1, and a semiconductor switching device SW1 such as an FET (Field-Effect Transistor); a passenger seat squib circuit composed of a series connection of a safety sensor SS2, a squib SQ2, and a semiconductor switching device SW2 such as an FET, and an electronic accelerometer (collision sensor) AM for detecting negative acceleration due to collisions; sand a control circuit CC provided with functions for judging the presence or absence of a collision according to an output signal of the electronic accelerometer AM and supplying signals to the gates of the semiconductor switching devices SW1 and SW2.

When a car provided with the air bag system collides with something, switches of the safety sensors SS1 and SS2 are closed with relatively small negative acceleration enabling the driver's seat squib circuit and the passenger seat squib circuit. If the control circuit CC judges that the car actually collided with something according to the output signal from the electronic accelerometer AM, the control circuit CC supplies a signal to the gates of the semiconductor switching devices SW1 and SW2, and the semiconductor switching devices SW1 and SW2 are turned ON. Currents then pass through the two squib circuits. Due to the currents, the squibs SQ1 and SQ2 are heated and thereby the air bags for the driver's seat and the passenger seat are deployed to protect the passengers from impact damage by the collision.

Incidentally, such an air bag system is effective for saving the passenger in the case where an adult person P is seated on the seat 1 as shown in FIG. 2A. However, in the case where an infant SP is seated on an infant seat 1A fixed on the passenger seat facing rearward (hereafter referred to as 'RFIS (Rear Facing Infant Seat)' as shown in FIG.2B, deployment of the air bag might hurt the infant, and thus it is preferable that the air bag does not deploy on the collision. Further, in the case where a child SP' is seated on a child seat 1A' fixed on the passenger seat facing forward (hereafter referred to as 'FFCS (Forward Facing Child Seat)' as shown in FIG. 2C, a deployed air bag might cover the face of the child SP' and suffocate the child SP', and thus it is preferable that the air bag does not deploy on the collision similarly to the case of RFIS.

As a countermeasure against the above problems, a circuit for air bag systems shown in FIG. 3 has been proposed, for example. The circuit of FIG. 3 further comprises a passenger detection sensor device SD. for detecting the status of the passenger on the passenger seat. The control circuit CC judges whether or not a passenger is seated on the passenger seat and the status of the passenger on the passenger seat, according to a detection signal from the passenger detection sensor device SD, and sets itself at an deployment mode, in which the control circuit CC deploys the air bag on collision, or at a no deployment mode, in which the control circuit CC does not deploy the air bag on collision. As the passenger detection sensor device SD, a device employing a weight sensor and a device employing image processing have been proposed. In the method employing image processing, the passenger is photographed by a camera and it is judged whether the passenger is an adult person P, a child SP', or an infant SP by means of image processing.

By the first method employing a weight sensor, whether the passenger is an adult P, or a child SP', or an infant SP can roughly be judged and the above unexpected accidents can basically be avoided by the setting of the control circuit CC into the deployment mode or the no deployment mode based on the judgment. However, such a method employing a weight sensor lacks precision since weight varies widely among individuals and there exist cases where a child SP' weighs more than a very thin adult person P. Further, it is impossible to judge whether the status of a little child on the passenger seat is RFIS or FFCS.

By the second method employing image processing, it is possible to judge rather precisely whether or not a passenger is seated on the passenger seat, whether the passenger is an adult P, a child SP', or an infant SP, and whether the status of a little child on the passenger seat is RFIS or FFCS. However, image processing and pattern matching against various kinds of patterns have to be executed to image data obtained by a camera, and thus a complex and expensive image processing device is needed.

Therefore, the present inventors have proposed a passenger detection system which is shown in FIG. 4A through FIG. 8 in Japanese Patent Application No.HEI9-42650. The system utilizes disturbance in a weak alternating electric field which is generated between two electrodes placed on a seat. Referring to FIG. 4A, an oscillator for generating high frequency low voltage is connected to an electrode E1, and another electrode E2 is grounded. An alternating electric field is generated between the electrodes E1 and E2 according to the potential difference between the electrodes E1 and E2, thereby a displacement current Id occurs between the electrode E2 and the ground. In this situation, if an object OB is placed in the electric field as shown in FIG. 4B, the electric field is disturbed by the object OB and thereby the displacement current Id varies into Id1. Almost every object OB can be represented by a conductance and a capacitance, and the object OB is regarded to be connected to the ground via the capacitance.

As shown above, the displacement current varies depending on whether or not an object OB exists on a seat of a car, and the status of a passenger on the seat can be detected by utilizing the phenomenon. Especially, a lot of information about an object on the seat including a passenger can be obtained by increasing the number of electrodes which are placed on the seat, thereby precise detection of the situation on the seat can be executed.

In the following, a concrete example of a passenger detection system utilizing the phenomenon will be described referring to FIG. 5 through FIG. 8. FIG. 5 is a perspective view of a passenger seat which is provided with the passenger detection system which has been proposed by the present inventors. A plurality of electrodes are placed on the upper side of the passenger seat 1. Specifically, electrodes E1 and E2, of quadrangular shapes for example, are placed apart on the cushion section 1a, and electrodes E3 and E4 of almost the same shapes are placed apart on the back section 1b. The electrodes E1~E4 are formed of electrically conductive fabrics in consideration of comfort of the passenger. However the electrodes E1~E4 can also be formed by weaving stringy metal in fabric which covers the seat, by applying electrically conductive paint on fabric which covers the seat, etc., or it is also possible to form the electrodes E1~E4 by metal plates. The electrodes E1~E4 are connected to a circuit which is shown in FIG. 6 and FIG. 7.

Referring to FIG. 6, the passenger detection system comprises an oscillator circuit 10 for generating high frequency low voltage (for example, 100 Khz and 10~12V), a loading current detection circuit 11, a transmission/reception switching circuit 12, a current-voltage converter circuit 13 provided with amplification capability, a detection circuit (demodulation circuit) 14 provided with band passing (unnecessary noise reduction) capability and AC-DC converting capability, an amplification circuit 15, an offset switching circuit 16, and a control circuit 17 such as an MPU which is connected with an air bag unit 18.

FIG. 7 is a circuit diagram showing more concrete details of FIG. 6. In the passenger detection system of FIG. 6 and FIG. 7, the amplification circuit 15 is composed of a first amplification circuit 15A whose gain is ×1 and a second amplification circuit 15B whose gain is ×100, and an analog selection circuit 19 is provided for selecting one of the outputs of the first and the second amplification circuits 15A and 15B according to control of the control circuit 17.

The loading current detection circuit 11 is, for example, composed of an impedance device such as a resistor 11a which is inserted into the circuit in series and an amplifier 11b for amplifying the terminal voltage of the resistor 11a, and a current supplied from the oscillator circuit 10 to a particular selected electrode (i.e. the loading current) is detected by the loading current detection circuit 11. The transmission/reception switching circuit 12 is composed of, for example, switching means Aa~Ad for connecting the output of the oscillator circuit 10 to an electrode which is selected out of the electrodes E1~E4 (hereafter referred to as a 'transmission electrode') and switching means Ba~Bd for connecting electrodes other than the transmission electrode (hereafter referred to as 'reception electrodes') to the current-voltage converter circuit 13, in which switching of the switching means Aa~Ad and Ba~Bd are controlled by the control circuit 17. Incidentally, it is preferable that the transmission/reception switching circuit 12 is composed of a multiplexer circuit. The current-voltage converter circuit 13 is composed of, for example, impedance devices such as resistors 13a for converting the displacement current passing through the reception electrodes into voltages, and amplifiers 13b for amplifying the converted voltages, in which a resistor 13a and an amplifier 13b are provided corresponding to each of the electrodes E1~E4. The analog selection circuit 19 is composed of, for example, four switching means 19a for being switched simultaneously and connecting the outputs of the second amplification circuit 15B to the control circuit 17 and four switching means 19b for being switched simultaneously and connecting the outputs of the first amplification circuit 15A to the control circuit 17.

FIG. 8 is a circuit diagram showing an example of a circuit which is employed in the air bag unit 18. The circuit of FIG. 8 is basically the same as the circuits of FIG. 1 and FIG. 3, except that the control circuit CC is connected with the control circuit 17 of the circuit of FIG. 6 and FIG. 7.

In the following, the operation of the passenger detection system of FIG. 4A through FIG. 8 will be described. First, according to signals from the control circuit 17, only the switching means Aa in the transmission/reception switching circuit 12 is closed in order to connect the output of the oscillator circuit 10 to the electrode E1, and the switching means Bb~Bd are closed in order to connect the electrodes E2~E4 to the current-voltage converter circuit 13. Thus, the high frequency low voltage is applied to the transmission electrode E1 by the oscillator circuit 10, and thereby the displacement currents occur in the reception electrodes E2~E4. The displacement currents of the reception electrodes E2~E4 are converted into voltages by the resistors 13a and amplified by the amplifiers 13b, and the amplified voltages are supplied to the detection circuit 14. Meanwhile, the loading current passing through the transmission electrode E1 is detected by the loading current detection circuit 11, and the result is supplied to the detection circuit 14 as data R(1,1) which will be explained later. In the detection circuit (demodulation circuit) 14, signal components of the amplified voltages around 100 KHz, for example, are band passed and unnecessary noise components are rejected according to the AC-DC converting function, and output signals of the detection circuit 14 are supplied to the first and the second amplification circuits 15A and 15B. Signals from one of the amplification circuits 15A and 15B are properly selected by the operation of the offset switching circuit 16 and the analog selection circuit 19, and the selected signals are supplied to the control circuit 17. For example, when the output signals from the detection circuit 14 can be measured using, full-range of the control circuit 17, only the four switching means 19b are simultaneously closed in order to supply the output signals of the first amplification circuit 15A (×1) to the control circuit 17. On the other hand, when the output signals from the detection circuit 14 are so small that subtle variations of the output signals can not be measured using the full-range of the control circuit 17, only the four switching means 19a are simultaneously closed in order to supply the output signals of the second amplification circuit 15B (×100) to the control circuit 17. In the control circuit 17, output signals from the amplification circuit 15A or 15B are A/D converted and stored in memory.

Subsequently, according to signals output from the control circuit 17, only the switching means Ab in the transmission/reception switching circuit 12 is closed in order to connect the output of the oscillator circuit 10 to the electrode E2, and the switching means Ba, Bc and Bd are closed in order to connect the electrodes E1, E3 and E4 to the current-voltage converter circuit 13. Thus, the high frequency low voltage is applied to the transmission electrode E2 by the oscillator circuit 10, and thereby the displacement currents occur in the reception electrodes E1, E3 and E4. The displacement currents of the reception electrodes E1, E3 and E4 are converted into voltages by the resistors 13a and amplified by the amplifiers 13b, and the amplified voltages are supplied to the detection circuit 14. Meanwhile, the loading current passing through the transmission electrode E2 is detected by the loading current detection circuit 11, and the result is supplied to the detection circuit 14 as data R(2,2) which will be explained later. Output signals from the detection circuit 14 are processed in the same way as above and the processed data are stored in the memory of the control circuit 17.

Subsequently, only the switching means Ac is closed in order to connect the output of the oscillator circuit 10 to the electrode E3, and the switching means Ba, Bb and Bd are closed in order to connect the electrodes E1, E2 and E4 to the current-voltage converter circuit 13. Thus, the high frequency low voltage is applied to the transmission electrode E3 by the oscillator circuit 10, and thereby the displacement currents occur in the reception electrodes E1, E2 and E4. The displacement currents of the reception electrodes E1, E2 and E4 are converted into voltages by the resistors 13a and amplified by the amplifiers 13b, and the amplified voltages are supplied to the detection circuit 14. Meanwhile, the loading current passing through the transmission electrode E3 is detected by the loading current detection circuit 11, and the result is supplied to the detection circuit 14 as data R(3,3) which will be explained later. Output signals from the detection circuit 14 are processed in the same way as above and the processed data are stored in the memory of the control circuit 17.

Subsequently, only the switching means Ad is closed in order to connect the output of the oscillator circuit 10 to the electrode E4, and the switching means Ba, Bb and Bc are closed in order to connect the electrodes E1, E2 and E3 to the current-voltage converter circuit 13. Thus, the high frequency low voltage is applied to the transmission electrode E4 by the oscillator circuit 10, and thereby the displacement currents occur in the reception electrodes E1, E2 and E3. The displacement currents of the reception electrodes E1, E2 and E3 are converted into voltages by the resistors 13a and amplified by the amplifiers 13b, and the amplified voltages are supplied to the detection circuit 14. Meanwhile, the loading current passing through the transmission electrode E4 is detected by the loading current detection circuit 11, and the result is supplied to the detection circuit 14 as data R(4,4) which will be explained later. Output signals from the detection circuit 14 are processed in the same way as above and the processed data are stored in the memory of the control circuit 17.

Then, the control circuit 17 calculates the seating pattern on the passenger seat 1 by executing arithmetic logic operations on the data. Various types of seating patterns are prestored preset in the control circuit 17, and a seating pattern which has been calculated using various combinations of a transmission electrode and reception electrodes chosen from the electrodes E1~E4 is compared with the prestored seating patterns and one or more matched seating patterns are extracted from the prestored seating patterns in order to judge the status of the passenger on the passenger seat 1. The control circuit 17 regards the following typical seating patterns as objects of matching, for example, a 'vacant seat pattern' in which no passenger is seated on the passenger seat 1, a 'FFCS pattern' in which a child is seated on the passenger seat 1 in FFCS, a 'RFIS pattern' in which an infant is seated on the passenger seat 1 in RFIS, and a 'person pattern' in which an adult person is seated on the passenger seat 1. By various combinations of a transmission electrode and reception electrodes chosen from the electrodes E1~E4, a plurality of data which are generally represented as R(i, j) can be obtained. Here, R(i, j) in which i=j is transmission data, and R(i, j) in which i≠j is reception data in which i and j are representing a transmission electrode and a reception electrode respectively. The control circuit 17 executes the arithmetic logic operations using 16 pieces of data R(i, j) for example, and extracts characteristics of the seating pattern.

Then, a signal according to the seating pattern determined by the control circuit 17 is transmitted by the control circuit 17 to the air bag unit 18. For example, a signal instructing the air bag unit 18 to set itself at the no deployment mode (in which the air bag unit 18 does not deploy the air bag for the passenger seat 1 on collision) is transmitted by the control circuit 17 in the case where the determined seating pattern is the vacant seat pattern, the FFCS pattern, or the RFIS pattern, and a signal instructing the air bag unit 18 to set itself at the deployment mode (in which the air bag unit 18 deploys the air bag for the passenger seat 1 on collision) is transmitted by the control circuit 17 in the case where the determined seating pattern is other than the above patterns. These signals are received by the control circuit CC of the air bag unit 18, and in the former case, the control circuit CC is set not to supply a gate signal to the semiconductor switching device SW2 on the side of the passenger seat 1 on collision. Incidentally, the semiconductor switching device SW1 on the side of the driver's seat is necessarily supplied with a gate signal on collision. In the latter case, the control circuit CC is set to supply gate signals to the semiconductor switching devices SW1 and SW2 on collision.

According to the above passenger detection system, a plurality of electrodes E1~E4 are placed on the upper side of the passenger seat 1 and a weak alternating electric field is generated due to high frequency low voltage applied between a selected transmission electrode and other reception electrodes and displacement currents depending on a seating pattern of the passenger on the passenger seat 1 pass through the reception electrodes. Therefore, the seating pattern of the passenger on the passenger seat 1 can be correctly detected by analyzing characteristic patterns in the displacement currents, and thereby the air bag unit 18 can be set at the no deployment mode or the deployment mode according to the seating pattern of the passenger on the passenger seat 1.

Further, the number of the electrodes placed on the passenger seat 1 can be arbitrarily increased, and the number of combinations of transmission electrodes and reception electrodes can also be increased in order to increase obtained data and execute more precise judgment of the seating pattern of the passenger on the passenger seat 1.

Furthermore, a large number of displacement current patterns corresponding to the 'empty pattern', the 'RFIS pattern', the 'FFCS pattern', 'person pattern', etc. corresponding to each combination of the transmission electrode and the reception electrodes can be stored in the control circuit 17 as the seating patterns. Therefore, actual seating pattern can be detected precisely by use of various combinations of transmission electrodes and reception electrodes and extracting a most probable seating pattern by executing pattern matching.

However, in the above passenger detection system, the electrodes are placed apart on the upper side of the passenger seat 1, only by providing (placing) the electrodes between cushion material and covering material composing the passenger seat 1. Therefore, the electrodes might be displaced due to movement of the covering material according to seating actions and rising actions of the passenger, and thus the distances between the electrodes might vary from predetermined distances.

The displacement current patterns corresponding to the 'empty pattern', the 'RFIS pattern', the 'FFCS pattern', 'person pattern', etc. for each combination of the transmission electrode and the reception electrodes which are placed according to the predetermined distances, are prestored in the control circuit 17, therefore, if the distances between the electrodes are changed from the predetermined distances, the displacement current patterns of the reception electrodes for the same particular seating pattern vary from original values. Therefore, determinations obtained by the comparison between the observed displacement current patterns and the prestored displacement current patterns become incorrect, and correct detection of the actual seating pattern becomes difficult.

The above problem can of course be resolved by fixing the electrodes on the cushion material by adhesives when placing the electrodes at predetermined positions. However, processing time for each step in automatic assembly lines is being made shorter and shorter. Therefore, it is difficult to finish placing the electrodes at a predetermined position, measuring and keeping the distances between them, and fixing them on the cushion material by the adhesives within a given processing time.

SUMMARY OF THE INVENTION

It is therefore the primary object of the present invention to provide a passenger detection system in which the process for installing the electrodes on the seat can be simplified and the positions of the electrodes can be precisely maintained with a relatively simple composition.

In accordance with a first aspect of the present invention, there is provided a passenger detection system for detecting seating status of a passenger on a seat of a vehicle. A plurality of electrodes are placed apart on the upper side of the seat, and a weak alternating electric field is generated between a transmission electrode, selected from the plurality of electrodes, and reception electrodes other than the transmission electrode, and displacement currents passing in the reception electrodes caused by the weak alternating electric field are detected. The seating status of the passenger on the seat is determined by analyzing the detected displacement currents. An electrode structure is preliminarily formed by fixing the electrodes apart from each other on an electrical insulating base material, and the electrode structure is placed between a cushion material and a covering material of the seat.

In accordance with a second aspect of the present invention, in the first aspect, the electrode structure is fixed to one or more components of the seat.

In accordance with a third aspect of the present invention, in the first aspect, the electrodes are formed of electrically conductive fabric.

In accordance with a fourth aspect of the present invention, in the first aspect, the electrodes are fixed to the base material by means of bonding by adhesives.

In accordance with a fifth aspect of the present invention, in the first aspect, the electrodes are fixed to the base material by means of bonding by heating of thermoplastic resin or thermosetting resin.

In accordance with a sixth aspect of the present invention, in the fifth aspect, the electrodes are fixed to the base material by impregnating or applying thermoplastic resin, or thermosetting resin having bonding capability when the electrodes and/or the base material are heated placing the electrodes at predetermined positions on the base material, and heating and pressing the base material on which the electrodes have been placed.

In accordance with a seventh aspect of the present invention, in the first aspect, the electrodes are fixed to the base material by sewing.

In accordance with an eighth aspect of the present invention, in the first aspect, the electrodes are fixed to the base material by coupling by means of hooks, buttons, or snaps.

In accordance with a ninth aspect of the present invention, in the first aspect, the electrodes are fixed to the base material by coupling by means of fasteners such as hook-and-loop (VELCRO) fasteners.

In accordance with a tenth aspect of the present invention, in the first aspect, the electrodes are provided to one side of the base material.

In accordance with an eleventh aspect of the present invention, in the first aspect, the electrodes of the electrode structure are provided with wire harness to the end of which a connector is provided.

In accordance with a twelfth aspect of the present invention, in the first aspect, the electrode structure for a cushion section of the seat and the electrode structure for a back section of the seat are formed separately, and the two electrode structures are provided to the cushion section and the back section of the seat respectively.

In accordance with a thirteenth aspect of the present invention, in the twelfth aspect, two electrodes are fixed on the electrode structure for the cushion section and two electrodes are fixed on the electrode structure for the back section.

In accordance with a fourteenth aspect of the present invention, in the first aspect, the electrode structure for a cushion section and a back section of the seat is formed on one base material, and the electrode structure are placed under the covering materials of the cushion section and the back section of the seat.

In accordance with a fifteenth aspect of the present invention, in the fourteenth aspect, the electrode structure is provided with two electrodes for being placed on the cushion section of the seat and two electrodes for being placed on the back section of the seat.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
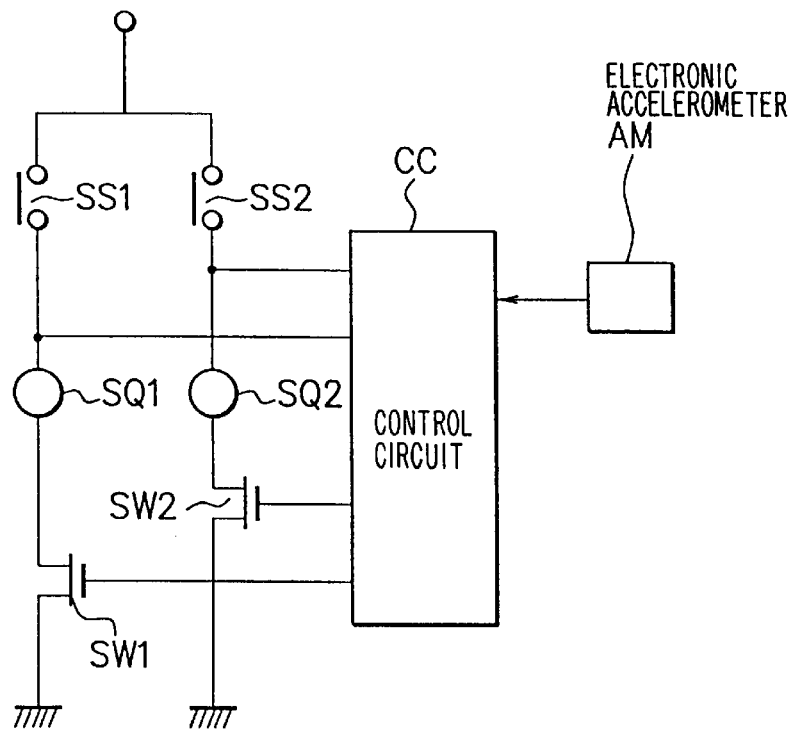
FIG. 1 is a circuit diagram showing a conventional circuit employed in air bag systems.
Figure 2A:
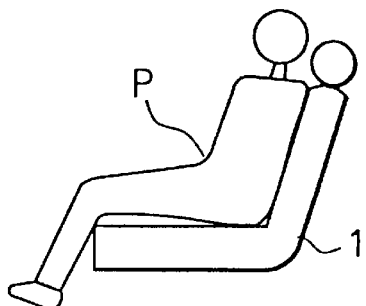
FIG. 2A through FIG. 2C are schematic diagrams showing statuses of a passenger on a passenger seat.
Figure 2B:
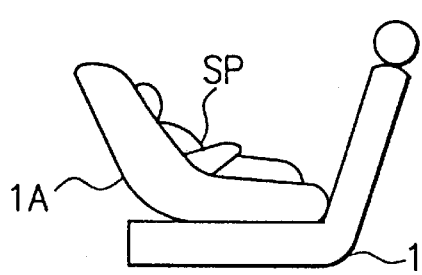
Figure 2C:
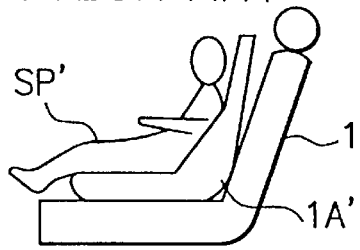
Figure 3:
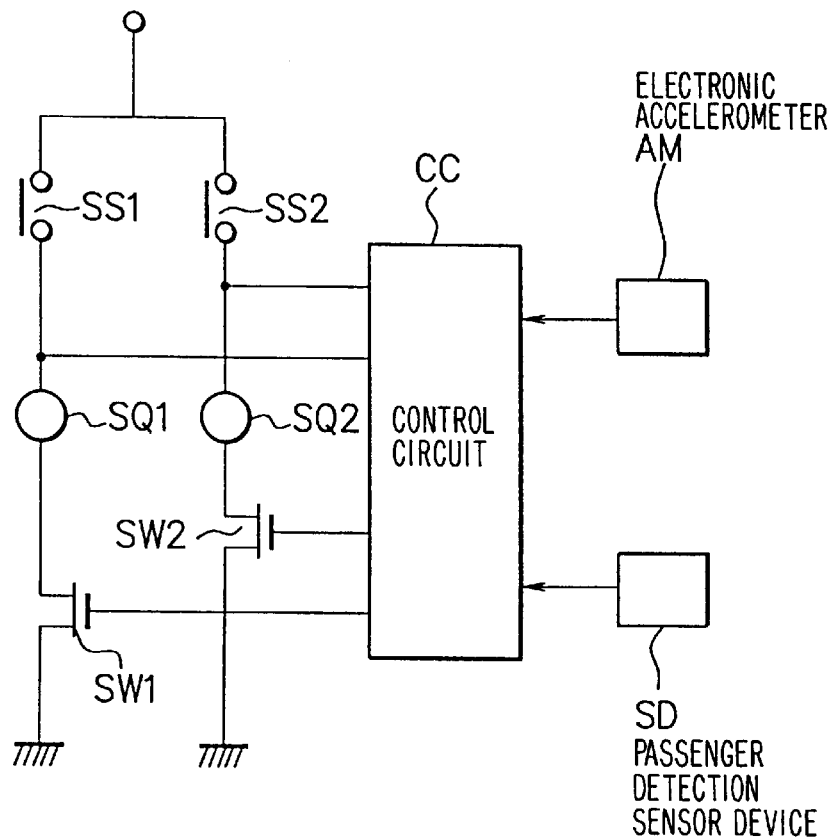
FIG. 3 is a circuit diagram showing another conventional circuit proposed for air bag systems.

Referring now to the drawings, a description will be given in detail of preferred embodiments in accordance with the present invention.

Figure 9:
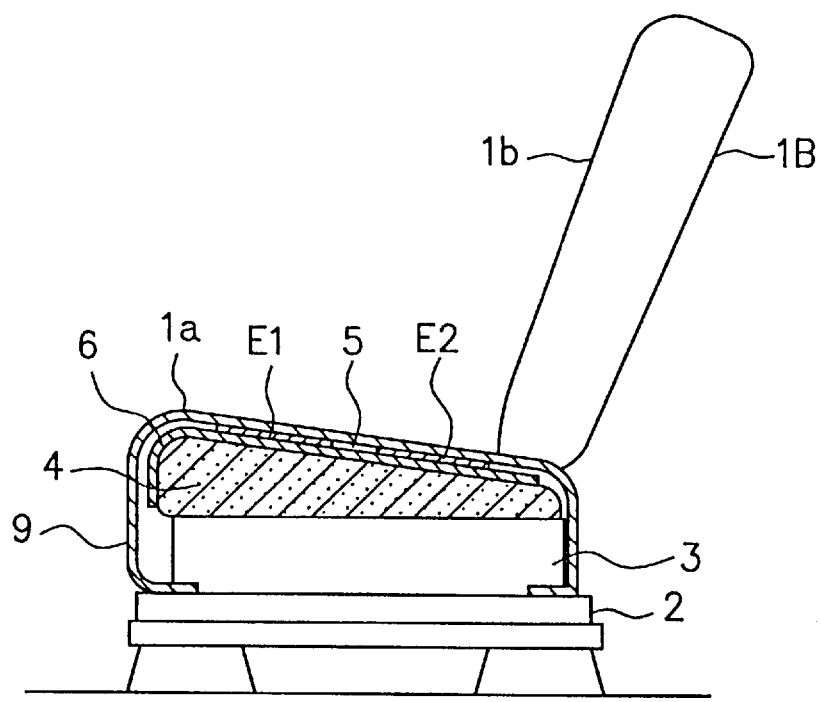
FIG. 9 is a partly sectional fragmentary schematic illustration of a seat which is provided with a passenger detection system according to a first embodiment of the present invention.

FIG. 9 is a partly sectional fragmentary schematic illustration of a seat which is provided with a passenger detection system according to a first embodiment of the present invention. Referring to FIG. 9, the passenger seat 1B according to the present invention is mainly composed of a cushion section 1a and a back section 1b. The cushion section 1a is composed of a seat frame 3 fixed on, for example, a base 2 which is slidable back and forth, a cushion material 4 which is placed on the seat frame 3, an electrode structure 5 which is placed along the surface of the cushion material 4, and a covering material 9 covering the electrode structure 5 and the cushion section 1a. It is preferable that the electrode structure 5 is fixed to one or more components of the cushion section 1a, such as the cushion material 4, the covering material 9, etc., Incidentally, the back section 1b is also provided with an electrode structure in similar way to the electrode structure 5 of the cushion section 1a.

Figure 10:
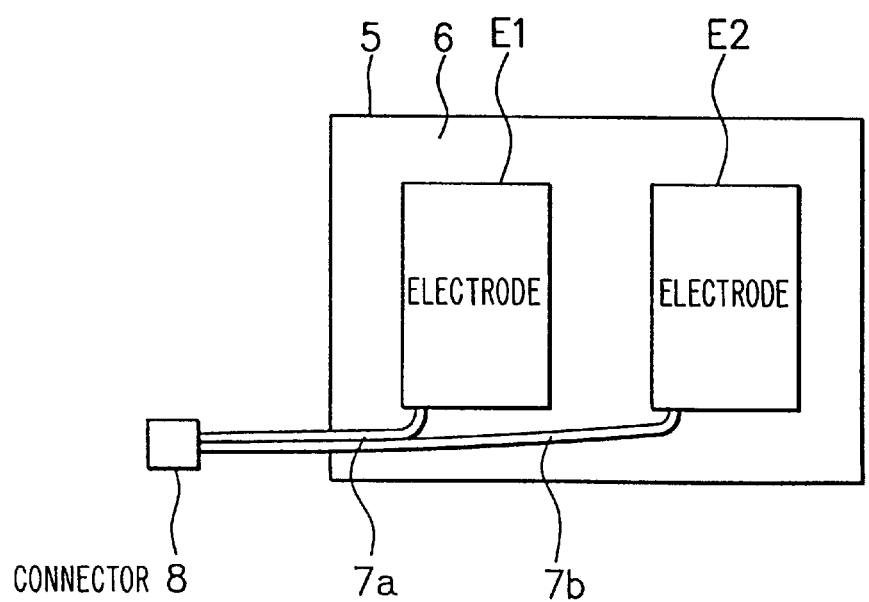
FIG. 10 is a plan view of an electrode structure which is provided to a cushion section of the seat of FIG. 9.

FIG. 10 is a plan view of the electrode structure 5 provided to the cushion section 1a of the passenger seat 1B of FIG. 9. Referring to FIG. 10, the electrode structure 5 is composed of a base material 6 which is made of, for example, an electrical insulating material and has almost the same space as the cushion section 1a of the passenger seat 1B, a plurality of electrodes E1 and E2 which are placed and fixed apart from each other on one side of the base material 6 so that the distance between the electrodes E1 and E2 will be a predetermined distance, wire harness 7a and 7b connected to the electrodes E1 and E2 respectively, and a connector 8 which is provided to the end of the wire harness 7a and 7b. The connector 8 is connected to a connector which is provided to the transmission/reception switching circuit 12 of the circuit of FIG. 6 and FIG. 7. Incidentally, it is preferable that the electrodes E1 and E2 are provided to the same side of the base material 6 as mentioned above, since effects of the base material 6 to an electric field generated between the electrodes E1 and E2 can be avoided.

Incidentally, the base material 6 is made of, for example, a fabric, a cushion material, a foam material, etc. having a thickness that does not impair the function and comfort of the passenger seat 1B. The electrodes E1 and E2 can be formed of electrically conductive fabrics in consideration of comfort of the passenger, or the electrodes E1 and E2 can be formed by weaving stringy metal in fabric, by applying electrically conductive paint on fabric, by metal plates, by metal foils such as copper foils, aluminum foils, etc., by flexible printed circuit boards, etc.

The electrodes E1 and E2 can be fixed to the base material 6 by various methods, such as bonding by adhesives, bonding by heating of thermoplastic resin or thermosetting resin, sewing, coupling by means of hooks, buttons, snaps (sockets and balls), etc., coupling by means of fasteners such as hook-and-loop (VELCRO) fasteners, etc. For example, the following method is recommendable. First, thermoplastic resin or thermosetting resin, which has bonding capability when heated, is impregnated into or applied to the electrodes E1 and E2 and/or the base material 6. Subsequently, the electrodes E1 and E2 are placed at predetermined positions on the base material 6. Then, the base material 6 on which the electrodes E1 and E2 have been placed is heated and pressed in order to fix the electrodes E1 and E2 on the base material 6. Incidentally, the electrodes (for example, two electrodes E3 and E4) of the electrode structure for the back section 1b can also be fixed by the methods described above.

Figure 4A:
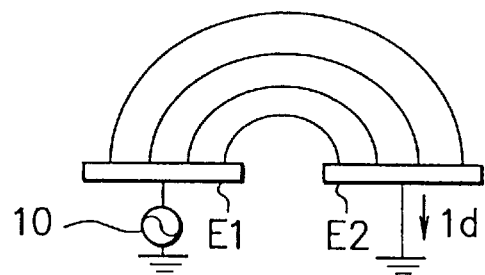
FIG. 4A and FIG. 4B are schematic diagrams showing the principles of a passenger detection system which has been proposed by the present inventors.
Figure 4B:
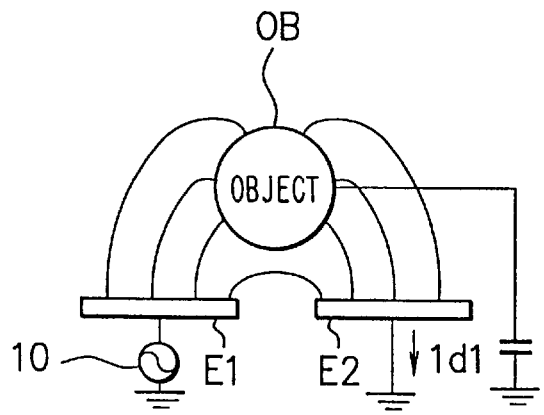
Figure 5:
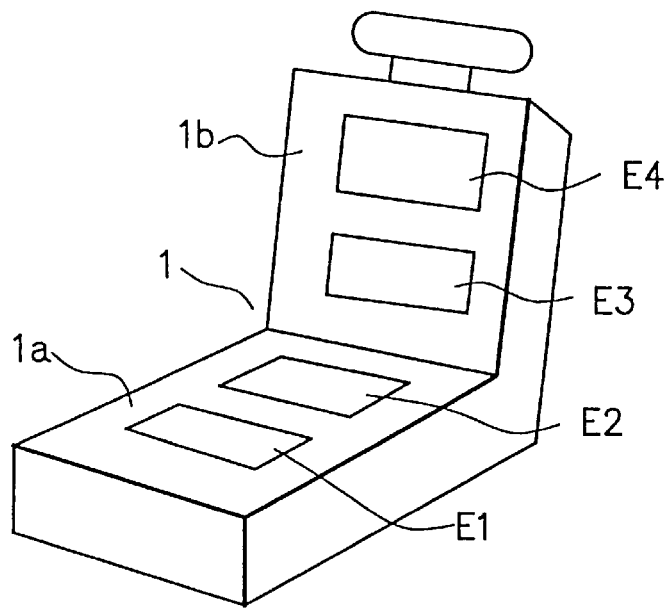
FIG. 5 is a perspective view of a passenger seat which is provided with the passenger detection system which has been proposed by the present inventors.

The passenger detection system of the first embodiment, other than fixing structure of the electrodes (E1~E4) placed on the passenger seat 1B, is basically the same as the passenger detection system which has been proposed by the present inventors in Japanese Patent Application No.HEI9-42650 and has been shown in FIG. 4A through FIG. 8. The passenger detection system utilizes disturbances in a weak alternating electric field which is generated between electrodes placed on the passenger seat 1B. Referring to FIG. 4A and FIG. 4B, an oscillator circuit 10 for generating high frequency low voltage is connected to the electrode E1 and the electrode E2 is grounded, for example. An alternating electric field is generated between the electrodes E1 and E2 according to the potential difference between the electrodes E1 and E2, thereby a displacement current Id occurs between the electrode E2 and the ground. In this situation, an object OB placed in the electric field as shown in FIG. 4B disturbs the electric field and thereby the displacement current Id is varied into Id1. The passenger detection system of the present invention detects the status of the passenger on the passenger seat 1B utilizing the phenomenon.

Figure 6:
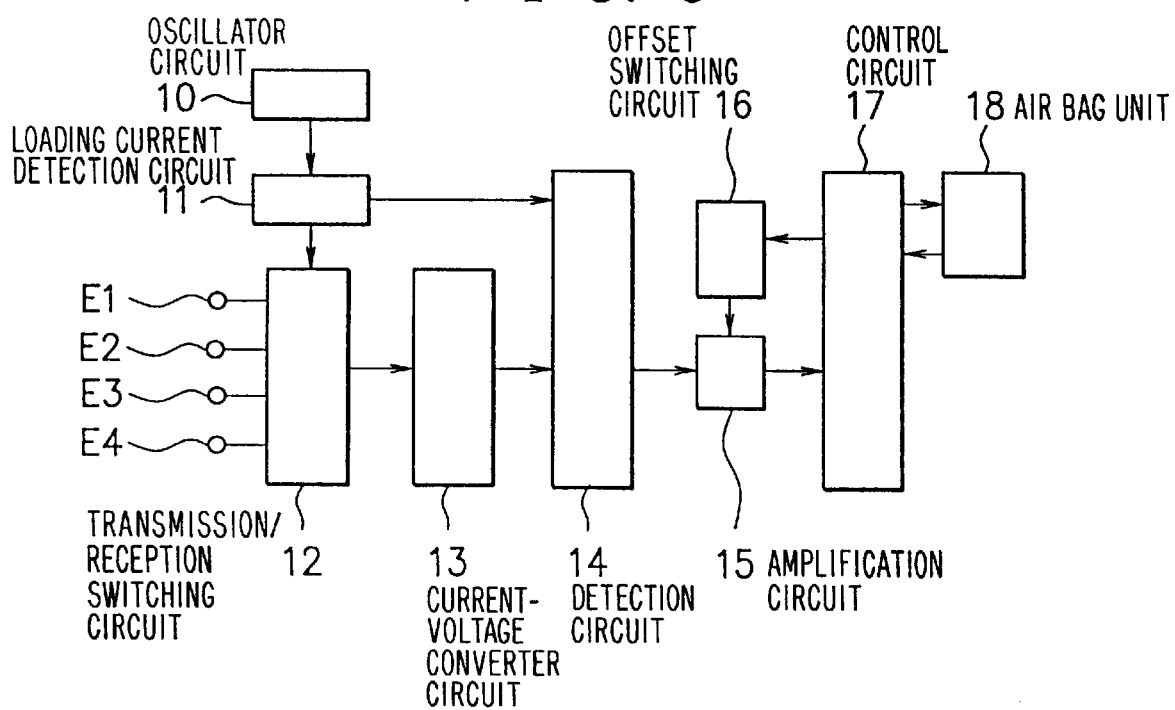
FIG. 6 is a circuit diagram showing the passenger detection system which has been proposed by the present inventors.

Referring to FIG. 6, the passenger detection system comprises the oscillator circuit 10 for generating high frequency low voltage (for example, 10~12 V at 100 Khz, a loading current detection circuit 11, a transmission/reception switching circuit 12, a current-voltage converter circuit 13 provided with amplification capability, a detection circuit (demodulation circuit) 14 provided with band passing (unnecessary noise reduction) capability and AC-DC converting capability, an amplification circuit 15, an offset switching circuit 16, and a control circuit 17 such as an MPU which is connected with an air bag unit 18. As mentioned above, the connector 8 of the electrode structure 5 is connected to a connector which is provided to the transmission/reception switching circuit 12.

Figure 7:
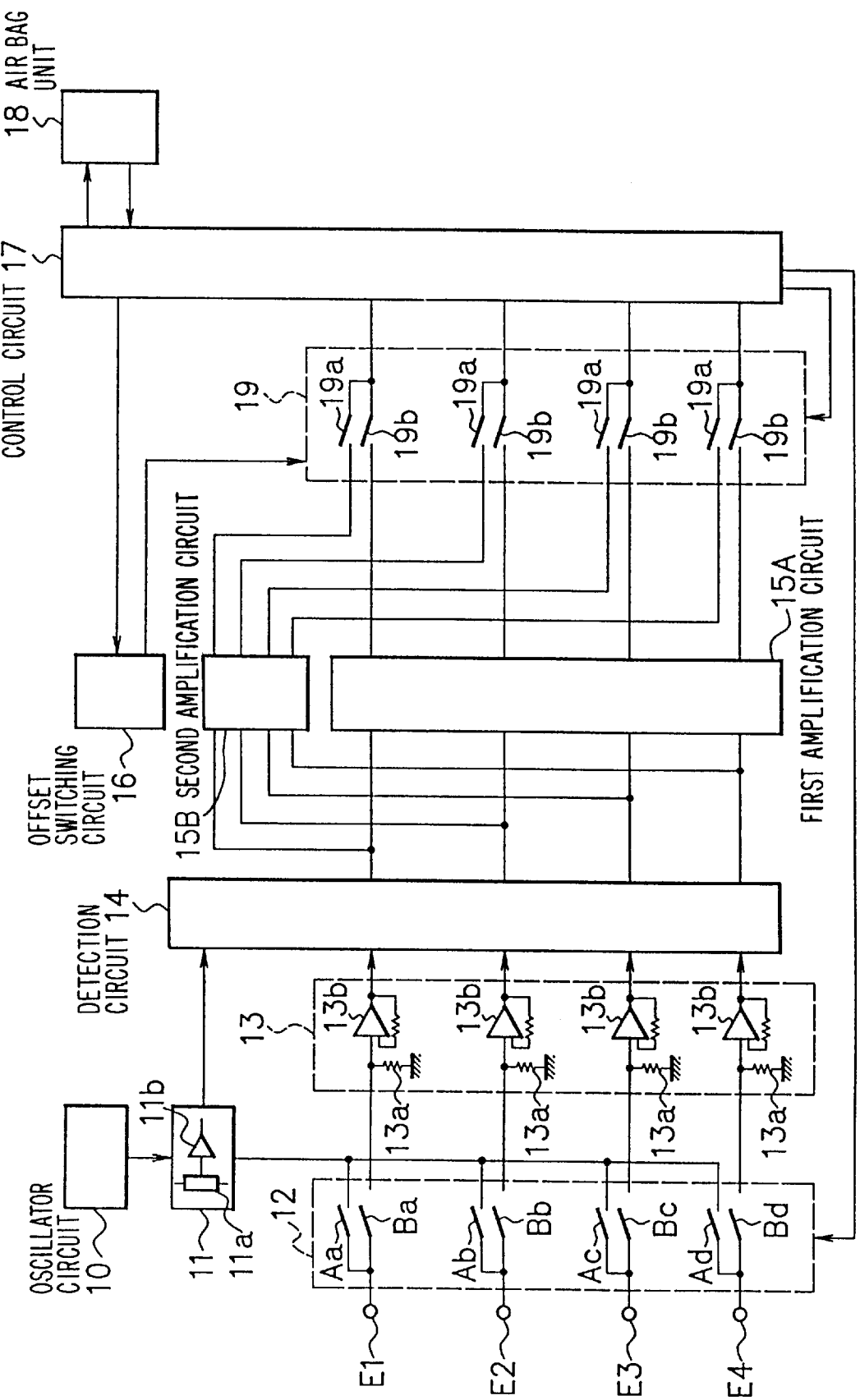
FIG. 7 is a circuit diagram showing more concrete details of FIG. 6.

Referring to FIG. 7 which is showing more concrete details of FIG. 6, the amplification circuit 15 is composed of a first amplification circuit 15A whose gain is ×1 and a second amplification circuit 15B whose gain is ×100, and an analog selection circuit 19 is provided for selecting one of the outputs of the first and the second amplification circuits 15A and 15B according to control of the control circuit 17. The loading current detection circuit 11 is, for example, composed of an impedance device such as a resistor 11a which is inserted into the circuit in series and an amplifier 11b for amplifying the terminal voltage of the resistor 11a, and a current supplied from the oscillator circuit 10 to a particular selected electrode (i.e. the loading current) is detected by the loading current detection circuit 11. The transmission/reception switching circuit 12 is composed of, for example, switching means Aa~Ad for connecting the output of the oscillator circuit 10 to an electrode which is selected out of the electrodes E1~E4 (i.e. a transmission electrode) and switching means Ba~Bd for connecting electrodes other than the transmission electrode (i.e. reception electrodes) to the current-voltage converter circuit 13, in which switching of the switching means Aa~Ad and Ba~Bd are controlled by the control circuit 17. It is preferable that the transmission/reception switching circuit 12 is composed of a multiplexer circuit. The current-voltage converter circuit 13 is composed of, for example, impedance devices such as resistors 13a for converting the displacement current passing through the reception electrodes into voltages and amplifiers 13b for amplifying the converted voltages, in which a resistor 13a and an amplifier 13b are provided corresponding to each of the electrodes E1~E4. The analog selection circuit 19 is composed of, for example, four switching means 19a for being switched simultaneously and connecting the outputs of the second amplification circuit 15B to the control circuit 17 and four switching means 19b for being switched simultaneously and connecting the outputs of the first amplification circuit 15A to the control circuit 17.

Figure 8:
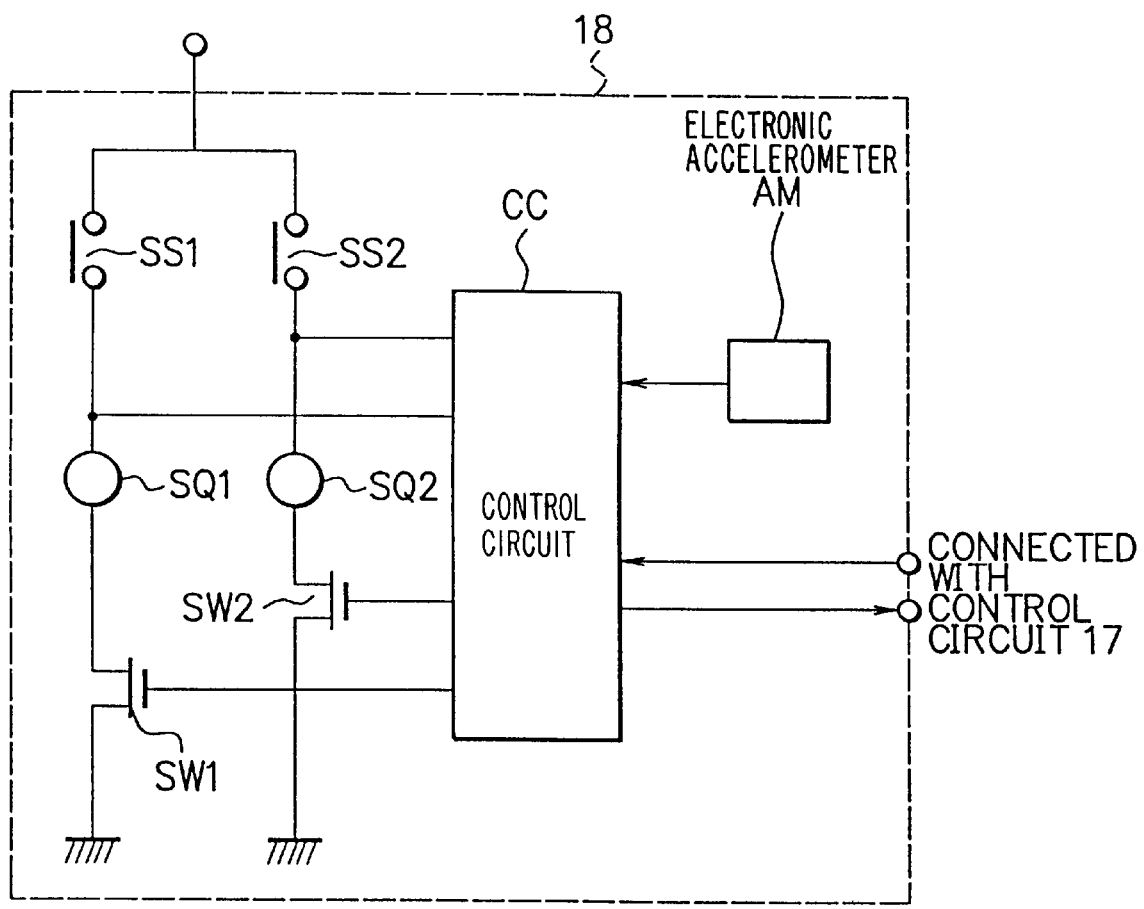
FIG. 8 is a circuit diagram showing an example of a circuit which is employed in an air bag unit which is connected with the passenger detection system of FIG. 6 and FIG. 7.

Referring to FIG. 8 which is showing an example of a circuit employed in the air bag unit 18, the circuit for the air bag unit 18 comprises: a driver's seat squib circuit composed of a series connection of a safety sensor SS1 such as a mechanical accelerometer, a squib SQ1, and a semiconductor switching device SW1 such as an FET; a passenger seat squib circuit composed of a series connection of a safety sensor SS2, a squib SQ2, and a semiconductor switching device SW2 such as an FET; an electronic accelerometer (collision sensor) AM for detecting negative acceleration due to collisions; and a control circuit CC provided with functions for judging the presence or absence of a collision according to an output signal of the electronic accelerometer AM and supplying signals to the gates of the semiconductor switching devices SW1 and SW2. The control circuit CC of the air bag unit 18 is connected with the control circuit 17 of the circuit of FIG. 6 and FIG. 7. The control circuit CC is set at the deployment mode in which the control circuit CC deploys the air bag for the passenger seat 1B on collision or at the no deployment mode in which the control circuit CC does not deploy the air bag for the passenger seat 1B on collision, according to a signal supplied from the control circuit 17. When a car provided with the air bag unit 18 collided with something, switches of the safety sensors SS1 and SS2 are closed with relatively small negative acceleration enabling the driver's seat squib circuit and the passenger seat squib circuit. If the control circuit CC is set at the deployment mode and the control circuit CC judges that the car actually collided with something according to the output signal from the electronic accelerometer AM, the control circuit CC supplies a signal to the gates of the semiconductor switching devices SW1 and SW2, and the semiconductor switching devices SW1 and SW2 are turned ON. Currents then pass through the squib circuits. Due to the currents, the squibs SQ1 and SQ2 are heated and thereby the air bags for the driver's seat and the passenger seat are deployed to protect the passengers from impact damage by the collision. On the other hand, if the control circuit CC is set at the no deployment mode and the control circuit CC judged that the car actually collided with something, the control circuit CC supplies a signal to the gate of the semiconductor switching device SW1 only in order to turn ON the semiconductor switching device SW1, thereby the squib SQ1 is heated and only the driver's seat air bag is deployed. In the no deployment mode, the air bag for the passenger seat 1B is not deployed, in order to protect the passenger on the passenger seat 1B, such as an infant in the RFIS, a child in the FFCS, etc., from injury due to deployment of the air bag.

In the following, the operation of the passenger detection system of the first embodiment will be described. The operation of the passenger detection system of the first embodiment is almost the same as that of the passenger detection system of FIG. 4A through FIG. 8 which has already been explained in the Description of the Prior Art, however the description will be repeated for the sake of clear understanding.

First, according to signals from the control circuit 17, only the switching means Aa in the transmission/reception switching circuit 12 is closed in order to connect the output of the oscillator circuit 10 to the electrode E1, and the switching means Bb~Bd are closed in order to connect the electrodes E2~E4 to the current-voltage converter circuit 13. Thus, the high frequency low voltage is applied to the transmission electrode E1 by the oscillator circuit 10, and thereby the displacement currents occur in the reception electrodes E2~E4. The displacement currents of the reception electrodes E2~E4 are converted into voltages by the resistors 13a and amplified by the amplifiers 13b, and the amplified voltages are supplied to the detection circuit 14. Meanwhile, the loading current passing through the transmission electrode E1 is detected by the loading current detection circuit 11, and the result is supplied to the detection circuit 14 as data R(1,1). In the detection circuit (demodulation circuit) 14, signal components of the amplified voltages around 100 KHz, for example, are band passed and unnecessary noise components are rejected according to the AC-DC converting function, and output signals of the detection circuit 14 are supplied to the first and the second amplification circuits 15A and 15B. Signals from one of the amplification circuits 15A and 15B are properly selected by the operation of the offset switching circuit 16 and the analog selection circuit 19, and the selected signals are supplied to the control circuit 17. For example, when the output signals from the detection circuit 14 can be measured using a full-range of the control circuit 17, only the four switching means 19b are simultaneously closed in order to supply the output signals of the first amplification circuit 15A (×1) to the control circuit 17. On the other hand, when the output signals from the detection circuit 14 are so small that subtle variations of the output signals can not be measured using the full-range of the control circuit 17, only the four switching means 19a are simultaneously closed in order to supply the output signals of the second amplification circuit 15B (×100) to the control circuit 17. In the control circuit 17, the output signals from the amplification circuit 15A or 15B are A/D converted and stored in memory.

Subsequently, according to signals output from the control circuit 17, only the switching means Ab in the transmission/reception switching circuit 12 is closed in order to connect the output of the oscillator circuit 10 to the electrode E2, and the switching means Ba, Bc and Bd are closed in order to connect the electrodes E1, E3 and E4 to the current-voltage converter circuit 13. Thus, the high frequency low voltage is applied to the transmission electrode E2 by the oscillator circuit 10, and thereby the displacement currents occur in the reception electrodes E1, E3 and E4. The displacement currents of the reception electrodes E1, E3 and E4 are converted into voltages by the resistors 13a and amplified by the amplifiers 13b, and the amplified voltages are supplied to the detection circuit 14. Meanwhile, the loading current passing through the transmission electrode E2 is detected by the loading current detection circuit 11, and the result is supplied to the detection circuit 14 as data R(2,2). Output signals from the detection circuit 14 are processed in the same way as above and the processed data are stored in the memory of the control circuit 17.

Subsequently, only the switching means Ac is closed in order to connect the output of the oscillator circuit 10 to the electrode E3, and the switching means Ba, Bb and Bd are closed in order to connect the electrodes E1, E2 and E4 to the current-voltage converter circuit 13. Thus, the high frequency low voltage is applied to the transmission electrode E3 by the oscillator circuit 10, and thereby the displacement currents occur in the reception electrodes E1, E2 and E4. The displacement currents of the reception electrodes E1, E2 and E4 are converted into voltages by the resistors 13a and amplified by the amplifiers 13b, and the amplified voltages are supplied to the detection circuit 14. Meanwhile, the loading current passing through the transmission electrode E3 is detected by the loading current detection circuit 11, and the result is supplied to the detection circuit 14 as data R(3,3). Output signals from the detection circuit 14 are processed in the same way as above and the processed data are stored in the memory of the control circuit 17.

Subsequently, only the switching means Ad is closed in order to connect the output of the oscillator circuit 10 to the electrode E4, and the switching means Ba, Bb and Bc are closed in order to connect the electrodes E1, E2 and E3 to the current-voltage converter circuit 13. Thus, the high frequency low voltage is applied to the transmission electrode E4 by the oscillator circuit 10, and thereby the displacement currents occur in the reception electrodes E1, E2 and E3. The displacement currents of the reception electrodes E1, E2 and E3 are converted into voltages by the resistors 13a and amplified by the amplifiers 13b, and the amplified voltages are supplied to the detection circuit 14. Meanwhile, the loading current passing through the transmission electrode E4 is detected by the loading current detection circuit 11, and the result is supplied to the detection circuit 14 as data R(4,4). Output signals from the detection circuit 14 are processed in the same way as above and the processed data are stored in memory of the control circuit 17.

Then, the control circuit 17 calculates the seating pattern on the passenger seat 1 by executing arithmetic logic operations on the data. Various types of seating patterns are prestored preset in the control circuit 17, and a seating pattern which has been calculated using various combinations of a transmission electrode and reception electrodes chosen from the electrodes E1~E4 is compared with the prestored seating patterns and one or more matched seating patterns are extracted from the prestored seating patterns in order to judge the status of the passenger on the passenger seat 1. The control circuit 17 regards the following typical seating patterns as objects of matching, for example, a 'vacant seat pattern' in which no passenger is seated on the passenger seat 1, a 'FFCS pattern' in which a child is seated on the passenger seat 1 in FFCS, a 'RFIS pattern' in which an infant is seated on the passenger seat 1 in RFIS, and a 'person pattern' in which an adult person is seated on the passenger seat 1. By various combinations of a transmission electrode and reception electrodes chosen from the electrodes E1~E4, a plurality of data which are generally represented as R(i, j) can be obtained. Here, R(i, j) in which i=j is transmission data, and R(i, j) in which i≈j is reception data in which i and j are representing a transmission electrode and a reception electrode respectively. The control circuit 17 executes the arithmetic logic operations, using 16 pieces of data R(i, j) for example, and extracts characteristics of the seating pattern.

Then, a signal according to the seating pattern determined by the control circuit 17 is transmitted by the control circuit 17 to the air bag unit 18. For example, a signal instructing the air bag unit 18 to set itself at the no deployment mode (in which the air bag unit 18 does not deploy the air bag for the passenger seat 1B on collision) is transmitted by the control circuit 17 in the case where the determined seating pattern is the vacant seat pattern, the FFCS pattern, or the RFIS pattern, and a signal instructing the air bag unit 18 to set itself at the deployment mode (in which the air bag unit 18 deploys the air bag for the passenger seat 1B on collision) is transmitted by the control circuit 17 in the case where the determined seating pattern is other than the above patterns. These signals are received by the control circuit CC of the air bag unit 18, and in the former case, the control circuit CC is set not to supply a gate signal to the semiconductor switching device SW2 on the side of the passenger seat 1 on collision. The semiconductor switching device SW1 on the side of the driver's seat is necessarily supplied with a gate signal on collision. In the latter case, the control circuit CC is set to supply gate signals to the semiconductor switching devices SW1 and SW2 on collision. By the operation described above, the seating pattern of the passenger on the passenger seat 1B can be correctly detected by analyzing characteristic patterns in the displacement currents, and thereby the air bag unit 18 can be set at the no deployment mode or the deployment mode correctly according to the detected seating pattern.

As described above, according to the first embodiment, in a passenger detection system for detecting seating status of a passenger on the passenger seat 1B a plurality of electrodes E1~E4 (for example) are placed from each other apart on the upper side of the passenger seat 1B and generate a weak alternating electric field between a transmission electrode, selected from the electrodes E1~E4, and reception electrodes other than the transmission electrode, and displacement currents passing in the reception electrodes caused by the weak alternating electric field are detected. The electrodes E1 and E2 are fixed at predetermined positions on the base material 6 and preliminarily assembled as the electrode structure 5, and the electrodes E3 and E4 (for example) are fixed at predetermined positions on another base material and preliminarily assembled as another electrode structure. Therefore, the electrodes E1 and E2 can be placed on the cushion section 1a of the passenger seat 1B, thereby keeping the predetermined distance between the electrodes E1 and E2 by only placing or fixing the electrode structure 5 between the cushion material 4 and the covering material 9 of the cushion section 1a. The variation of the distance between the electrodes E1 and E2 from the predetermined distance can be avoided almost, even if the covering material 9 of the cushion section 1a is moved according to seating actions and rising actions of the passenger. The same effect can be obtained for the electrodes on the back section 1b of the passenger seat 1B. Therefore, the actual seating pattern of the passenger on the passenger seat 1B can be judged precisely, preventing variation of the distances between the electrodes and utilizing the seating patterns (the displacement current patterns) which are prestored in the control circuit 17.

Further, in automatic assembly lines, in which processing time for each steps is being shortened, the electrodes E1 and E2 can be placed on the cushion section 1a of the passenger seat 1B precisely keeping the predetermined distance between the electrodes E1 and E2 by only a simple process of placing or fixing the electrode structure 5 on the cushion material 4. The same effect can be obtained for the electrodes on the back section 1b of the passenger seat 1B. Therefore, the installation of the electrodes can easily be finished within a given processing time with reliability in the automatic assembly line, and thus smoothness of processes on the automatic assembly line can be maintained.

Furthermore, the electrodes E1 and E2 on the electrode structure 5 are provided with the wire harness 7a and 7b to the end of which the connector 8 is provided. Therefore, connection of the electrodes E1 and E2 to the circuit of FIG. 6 and FIG. 7 (i.e. the control unit of the passenger detection system) can be performed easily. The same effect can be obtained for the electrodes on the back section 1b of the passenger seat 1B. Especially, in the case where the control unit is placed on the seat frame 3 of the passenger seat 1B, the length of the harness 7a and 7b can be shortened and the cost can be reduced.

Figure 11:
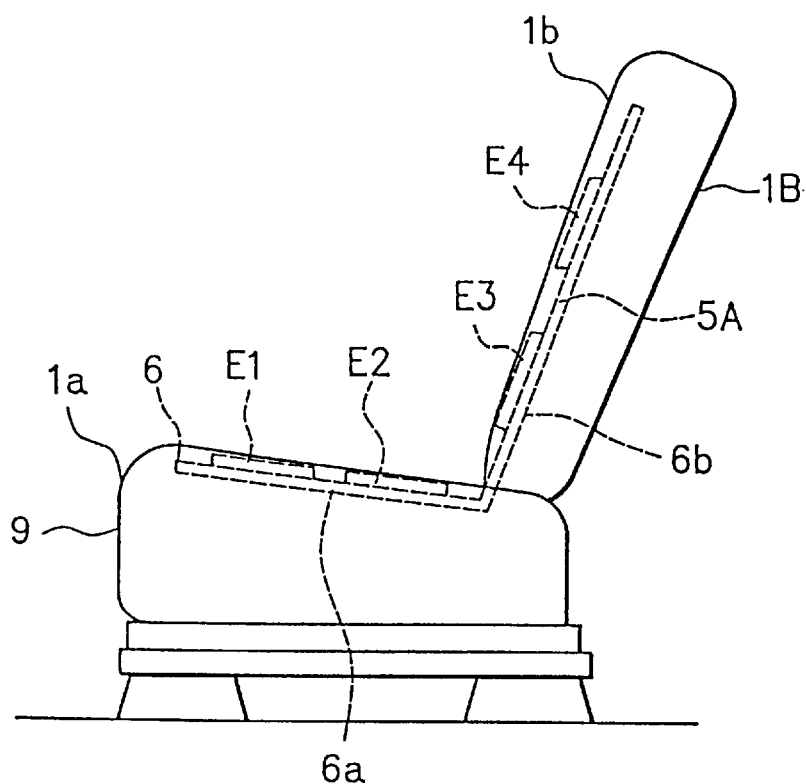
FIG. 11 is a schematic illustration of a seat which is provided with a passenger detection system according to a second embodiment of the present invention.
Figure 12:
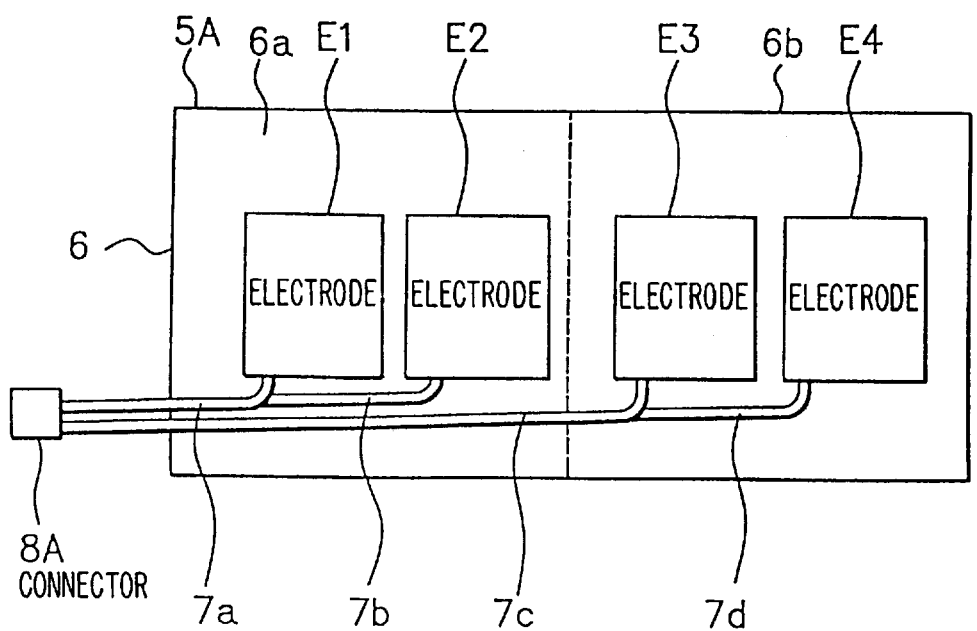
FIG. 12 is a plan view of an electrode structure which is provided to the seat of FIG. 11.

FIG. 11 is a schematic illustration of a seat which is provided with a passenger detection system according to a second embodiment of the present invention, and FIG. 12 is a plan view of an electrode structure 5A which is provided to the seat of FIG. 11. The second embodiment is basically the same as the first embodiment, except that the electrode structure 5A of the second embodiment is formed by combining a first base material 6a, which is placed in the cushion section 1a, and a second base material 6b, which is placed in the back section 1b into one. In the electrode structure 5A, a plurality of electrodes E1 and E2 are fixed at predetermined positions on the first base material 6a, and a plurality of electrodes E3 and E4 are fixed at predetermined positions on the second base material 6b. The electrodes E1~E4 are provided with wire harness 7a~7d respectively, and a connector 8A is provided to the end of the wire harnesses 7a~7d. The electrode structure 5A is placed under covering materials 9 of the cushion section 1a and the back section 1b of the passenger seat 1B. It is preferable that the electrode structure 5A is fixed to one of components of the passenger seat 1B, such as the cushion material 4, the covering material 9, etc., The connector 8A of the electrode structure 5A is connected to the connector which is provided to the transmission/reception switching circuit 12 of the circuit of FIG. 6 and FIG. 7.

The other composition and the operation of the passenger detection system are the same as those of the first embodiment, and thus repeated description thereof is omitted for brevity.

According to the second embodiment, all of the necessary electrodes E1~E4 are fixed at predetermined positions on one base material 6 and preliminarily assembled as one electrode structure 5A. Therefore, the electrodes E1~E4 can be placed on the passenger seat 1B keeping the predetermined distances between the electrodes E1~E4 by only placing or fixing the electrode structure 5A under the covering materials 9 of the passenger seat 1B. The variation of the distances between the electrodes E1~E4 from the predetermined distances can be avoided almost perfectly even if the covering materials 9 is moved according to seating actions and rising actions of the passenger. Therefore, the actual seating pattern of the passenger on the passenger seat 1B can be judged precisely, preventing variation of the distances between the electrodes and utilizing the seating patterns (or the displacement current patterns) which are prestored in the control circuit 17.

While the present invention has been described with reference to the particular illustrative embodiments, it is not to be restricted by those embodiments but only by the appended claims. For example, the shapes of the electrodes which are fixed on the electrode structures are not limited to quadrangles as shown above, and the shapes can be circles, ellipsoids, polygons, etc. The sizes of the electrodes and the number of the electrodes can be set arbitrarily. Although the electrode structures were placed all over the cushion section 1a and/or the back section 1b in the above embodiments, it is of course possible to provide the electrode structures so as to cover smaller areas on the cushion section 1a and/or the back section 1b. The wire harness can be provided to each electrode by connecting lead wires to the electrode, however it is also possible to form the wire harness by extending the material which composes the electrode. The oscillation frequency of the oscillator circuit 10 can be set at other than 100 Khz according to the situation in the car, targets of detection, etc., and the output voltage of the oscillator circuit 10 can also be varied adequately. The air bag unit 18 can employ a mechanical accelerometer instead of the electronic accelerometer AM. Further, the control unit of the passenger detection system is not limited to the circuit shown in FIG. 6 and FIG. 7 and the operation of the passenger detection system can be modified adequately. Furthermore, application of the passenger detection system according to the present invention is not limited to front seats of cars. It is also possible to apply the passenger detection system according to the present invention to rear seats of cars or seats of other vehicles. It is to be appreciated that those skilled in the art can change or modify the embodiments without departing from the scope and spirit of the present invention.

What is claimed is:

1. A passenger detection system for detecting seating status of a passenger on a seat of a vehicle by placing a plurality of electrodes apart on the upper side of the seat and generating a weak alternating electric field between a transmission electrode selected from the electrodes and reception electrodes other than the transmission electrode and detecting displacement currents passing in the reception electrodes caused by the weak alternating electric field, wherein:

an electrode structure is preliminarily formed by fixing the electrodes a predetermined distance apart on an electrical insulating base material, and the electrode structure is placed between a cushion material and a covering material of the seat.

2. A passenger detection system as claimed in claim 1, wherein the electrode structure is fixed to one or more components of the seat.

3. A passenger detection system as claimed in claim 1, wherein the electrodes are formed of electrically conductive fabric.

4. A passenger detection system as claimed in claim 1, wherein the electrodes are fixed to the base material by means of bonding by adhesives.

5. A passenger detection system as claimed in claim 1, wherein the electrodes are fixed to the base material by means of bonding by heating of thermoplastic resin or thermosetting resin.

6. A passenger detection system as claimed in claim 5, wherein the electrodes are fixed to the base material by impregnating or applying thermoplastic resin, or thermosetting resin having bonding capability when heated, to the electrodes and/or the base material, and placing the electrodes at predetermined positions on the base material, and heating and pressing the base material on which the electrodes have been placed.

7. A passenger detection system as claimed in claim 1, wherein the electrodes are fixed to the base material by sewing.

8. A passenger detection system as claimed in claim 1, wherein the electrodes are fixed to the base material by coupling by means of hooks, buttons, or snaps.

9. A passenger detection system as claimed in claim 1, wherein the electrodes are fixed to the base material by coupling by means of hook-and-loop fasteners such as VELCRO fasteners.

10. A passenger detection system as claimed in claim 1, wherein the electrodes are provided to one side of the base material.

11. A passenger detection system as claimed in claim 1, wherein the electrodes of the electrode structure are provided with a wire harness to the end of which a connector is provided.

12. A passenger detection system as claimed in claim 1, wherein the electrode structure for a cushion section of the seat and the electrode structure for a back section of the seat are formed separately, and the two electrode structures are provided to the cushion section and the back section of the seat respectively.

13. A passenger detection system as claimed in claim 12, wherein two electrodes are fixed on the electrode structure for the cushion section and two electrodes are fixed on the electrode structure for the back section.

14. A passenger detection system as claimed in claim 1, wherein the electrode structure for a cushion section and a back section of the seat is formed on one base material, and the electrode structure is placed under the covering materials of the cushion section and the back section of the seat.

15. A passenger detection system as claimed in claim 14, wherein the electrode structure is provided with two electrodes for being placed on the cushion section of the seat and two electrodes for being placed on the back section of the seat.

* * * * *